United States Patent
Enomoto et al.

[11] Patent Number: 5,815,322
[45] Date of Patent: Sep. 29, 1998

[54] ZOOM LENS SYSTEM HAVING HIGH ZOOM RATIO

[75] Inventors: Takashi Enomoto; Takayuki Ito, both of Tokyo, Japan

[73] Assignee: Asahi Kogaku Kogyo Kabushiki Kaisha, Tokyo, Japan

[21] Appl. No.: 907,411

[22] Filed: Aug. 7, 1997

[30] Foreign Application Priority Data

Aug. 12, 1996 [JP] Japan .................................. 8-212652

[51] Int. Cl.⁶ .................................................. G02B 15/14
[52] U.S. Cl. ............................................ 359/688; 359/683
[58] Field of Search .................................. 359/688, 683, 359/676

[56] References Cited

U.S. PATENT DOCUMENTS

| | | | |
|---|---|---|---|
| 3,912,376 | 10/1975 | Ogura et al. | 359/688 |
| 4,080,047 | 3/1978 | Uesugi et al. | 359/693 |
| 4,490,017 | 12/1984 | Okudaira et al. | 359/688 |
| 4,491,395 | 1/1985 | Okudaira | 359/688 |
| 5,189,557 | 2/1993 | Endo | 359/683 |
| 5,221,995 | 6/1993 | Yaneyama | 359/688 |
| 5,282,089 | 1/1994 | Abe | 359/688 |
| 5,585,969 | 12/1996 | Endo | 359/683 |

FOREIGN PATENT DOCUMENTS

| | | |
|---|---|---|
| 685945 | 1/1953 | United Kingdom . |
| 941754 | 11/1963 | United Kingdom . |
| 1064323 | 4/1967 | United Kingdom . |
| 1066501 | 4/1967 | United Kingdom . |
| 1109913 | 4/1968 | United Kingdom . |
| 1134776 | 11/1968 | United Kingdom . |
| 1190873 | 5/1970 | United Kingdom . |
| 1304470 | 1/1973 | United Kingdom . |
| 1437620 | 6/1976 | United Kingdom . |
| 1497551 | 1/1978 | United Kingdom . |

OTHER PUBLICATIONS

A United Kingdom Search Report issued with UK Application No. 9717137.5.

*Primary Examiner*—Scott J. Sugarman
*Attorney, Agent, or Firm*—Greenblum & Bernstein, P.L.C.

[57] ABSTRACT

A zoom lens system of high zoom ratio includes a first positive lens group, a second negative lens group, a third negative lens group, and a fourth positive lens group, arranged in this order from the object side. The second and third lens groups are moved during zooming while the first and fourth lens groups are stationary during zooming. The lens system satisfies the condition $1<(D_{3W}-D_{3T})/f_w<6$, where $D_{3W}$ represents the distance between the third lens group and the fourth lens group at the short focal length extremity, $D_{3T}$ represents the distance between the third lens group and the fourth lens group at the long focal length extremity, and $f_w$ represents the focal length of the entire zoom lens system at the short focal length extremity.

5 Claims, 10 Drawing Sheets

FIG. 1

FIG. 2A
FNO=1.6 d-LINE
g-LINE
c-LINE

-0.2　0.2
SPHERICAL
ABERRATION

CHROMATIC
ABERRATION

FIG. 2B
W=19.5

-0.05　0.05
TRANSVERSE
CHROMATIC
ABERRATION

-0.2　0.2
ASTIGMATISM

FIG. 2D
W=19.5

-5.0 (%) 5.0
DISTORTION

FIG. 3

FIG. 4A
FNO=1.6 d-LINE
g-LINE
c-LINE

-0.2  0.2
SPHERICAL
ABERRATION

CHROMATIC
ABERRATION

FIG. 4B
W=4.2

-0.05  0.05
TRANSVERSE
CHROMATIC
ABERRATION

-0.2  0.2
ASTIGMATISM

FIG. 4D
W=4.2

-5.0 (%) 5.0
DISTORTION

FNO=2.8

SPHERICAL
ABERRATION

CHROMATIC
ABERRATION

TRANSVERSE
CHROMATIC
ABERRATION

ASTIGMATISM

DISTORTION

FIG. 7

FIG. 8A
FNO=1.6

SPHERICAL ABERRATION
CHROMATIC ABERRATION

FIG. 8B
W=19.5

TRANSVERSE CHROMATIC ABERRATION

FIG. 8C
W=19.5

ASTIGMATISM

FIG. 8D
W=19.5

DISTORTION

ZOOM LENS SYSTEM HAVING HIGH ZOOM RATIO

BACKGROUND OF THE INVENTION

1. Field of the Invention

The present invention relates to a zoom lens system having a high zoom ratio, which can be applied to a TV camera such as a CCTV camera.

2. Description of the Related Art

In accordance with a variety of CCTV cameras, there has been a need for a zoom lens having a high zoom ratio. However, the zoom ratio of a conventional zoom lenses is, in many cases, in the range of approximately 10 to 15. If the zoom ratio is more than 15, the lens performance is reduced.

SUMMARY OF THE INVENTION

It is an object of the present invention to provide a zoom lens system having a high zoom ratio which is approximately equal to 20 with a high performance.

To achieve the object mentioned above, according to the present invention, there is provided a zoom lens system having high zoom ratio. A first lens group having positive refracting power, a second lens group having negative refracting power, a third lens group having negative refracting power, and a fourth lens group having positive refracting power, are arranged in this order from the object side. The second and third lens groups moved during zooming while the first and fourth lens groups are stationary during zooming. The system satisfies the following condition (1):

$$1 < (D_{3w} - D_{3T})/f_w < 6 \tag{1}$$

where $D_{3w}$ represents the distance between the third lens group and the fourth lens group at the short focal length extremity, $D_{3T}$ represents the distance between the third lens group and the fourth lens group at the long focal length extremity, and $f_w$ represents the focal length of the entire lens system at the short focal length extremity.

Preferably, the zoom lens system further satisfies the following condition (2):

$$6 < (D_{2w} + D_{3w})/f_w < 12 \tag{2}$$

where $D_{2w}$ represents the distance between the second lens group and the third lens group at the short focal length extremity.

Preferably, the zoom lens system satisfies the following conditions (3) and (4):

$$0.05 < f_w/f_1 < 0.12 \tag{3}$$

$$-0.5 < f_w/f_2 < -0.1 \tag{4}$$

where $f_1$ represents the focal length of the first lens group and $f_2$ represents the focal length of the second lens group.

It is preferable that at least one lens element of the first lens group satisfies the following condition (5):

$$80 < v_{d1} \tag{5}$$

where $v_{d1}$ represents the Abbe number of said at least one lens element of the first lens group.

It is preferable that at least one lens element of the fourth lens group satisfies the following condition (6):

$$80 < v_{d4} \tag{6}$$

wherein $v_{d4}$ represents the Abbe number of said at least one lens element of the fourth lens group.

The present disclosure relates to subject matter contained in Japanese Patent Application No.8-212652 (filed on Aug. 12, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 19:
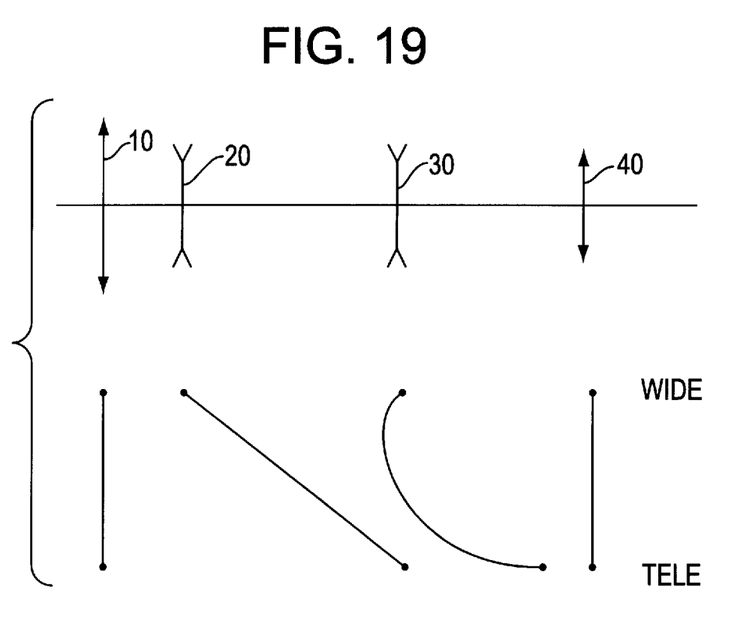

As may be seen in FIG. 19, a zoom lens system of high zoom ratio according to the present embodiment includes of a first positive lens group 10, a second negative lens group 20, a third negative lens group 30, and a fourth positive lens group 40. These lens groups 10 through 40 are arranged in this order from the object side. Upon zooming, the first and fourth positive lens groups 10 and 40 do not move and the second lens group 20 (variator) and the third lens group 30 (compensator) are moved. The focusing operation is carried out by the first lens group 10. Since the second and third lens groups 20 and 30 have a negative refracting power, the axial bundle is made incident upon the fourth lens group 40 as divergent light.

In the four-lens group type zoom lens system having positive, negative, negative and positive lens groups from the object side, the diameter of the third lens group can be reduced by decreasing the distance between the third lens group and the fourth lens group at the short focal length extremity, to thereby restrict the aberrations produced at the position far from the optical axis. The third lens group is moved closer to the fourth lens group to correct the focal position at the long focal length extremity. However, in the optical arrangement in which the F-number at the long focal length extremity is larger than the F-number at the short focal length extremity, no eclipse of the on-axis light occurs if the third lens group comes close to the fourth lens group.

The condition (1) specifies the movement distance of the third lens group from the short focal length extremity to the long focal length extremity. If the condition (1) is satisfied, the diameter of the third lens group can be decreased. Consequently, the aberration produced at the peripheral portion of the lens is reduced improving performance.

If the ratio defined in the condition (1) exceeds the upper limit, the total length of the lenses increases. If the ratio defined in the condition (1) is smaller than the lower limit, the diameter of the third lens group (compensator) increases such that aberrations occur due to light passing through the portion of the third lens group distant from the optical axis.

The condition (2) specifies the movement distance of the second lens group. If the condition (2) is satisfied, the movement distance of the second lens group is large enough to obtain a zoom ratio which is approximately equal to or greater than 20. If the ratio defined in the condition (2) exceeds the upper limit, the total lens length becomes unacceptably large. If the ratio defined in the condition (2) is smaller than the lower limit, it is impossible to obtain the zoom ratio of approximately 20.

The condition (3) specifies the power of the first lens group. If the condition (3) is satisfied, the aberration of the first lens group can be restricted, decreasing the influence of aberrations over the entire focal length range, from the short focal length extremity to the long focal length extremity.

If the power of the first lens group is larger than the upper limit specified in the condition (3), comatic aberration of the first lens group is so large that it influences the entire focal length range from the short focal length extremity to the long focal length extremity. If the ratio defined in the condition (3) is smaller than the lower limit, the moving distance of the lens of the first lens group upon focusing becomes large such the diameter of the frontmost lens element of the first lens group must be increased.

The condition (4) specifies the power of the second lens group. If the condition (4) is satisfied, the aberration of the second lens group can be restricted, decreasing the influence of the aberrations over the entire focal length range, from the short focal length extremity to the long focal length extremity. Moreover, the aberration fluctuation during zooming is reduced.

If the ratio defined in the condition (4) is larger than the upper limit, the movement distance of the second lens group upon zooming is large, increasing the total lens length. If the power of the second lens is so large that the ratio defined in the condition (4) is smaller than the lower limit, the comatic aberration of the second lens group is so large that it influences the entire focal length range, from the short focal length extremity to the long focal length extremity. Furthermore, the balance of aberration in the entire focal length range is worsened due to comatic aberration upon zooming.

The conditions (5) and (6) specify the Abbe number of at least one glass lens element of the first and fourth lens groups. In particular, if the condition (5) is satisfied, the longitudinal chromatic aberration at the long focal length extremity can be compensated. If both the conditions (5) and (6) are satisfied, the longitudinal chromatic aberration at the long and short focal length extremity can be compensated.

Numerical examples of the zoom lens system of the present invention will be discussed below.

<Embodiment 1>

Figure 1:
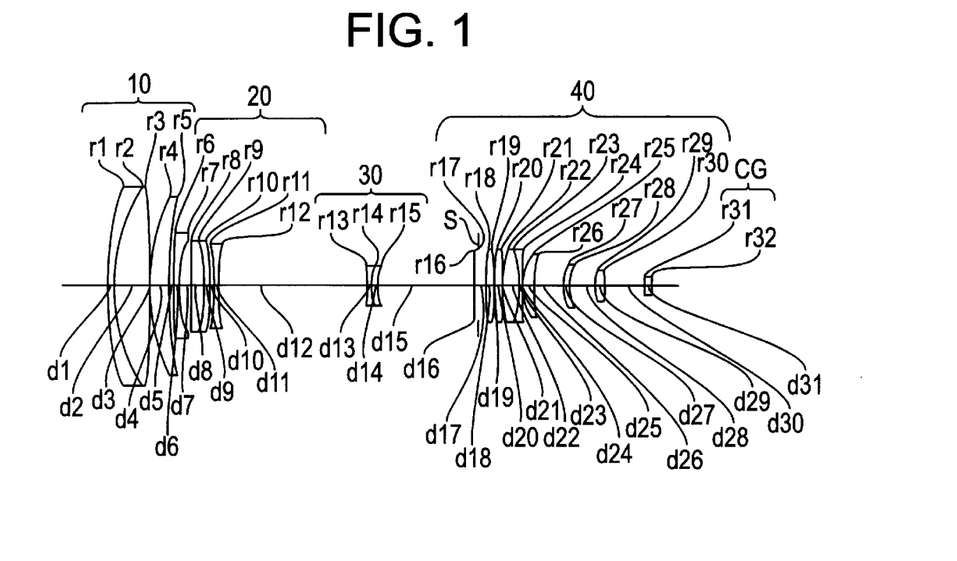
FIG. 1 is a schematic view showing the lens arrangement of a first embodiment of a zoom lens system of high zoom ratio at the short focal length extremity, according to the present invention.
Figure 2A:
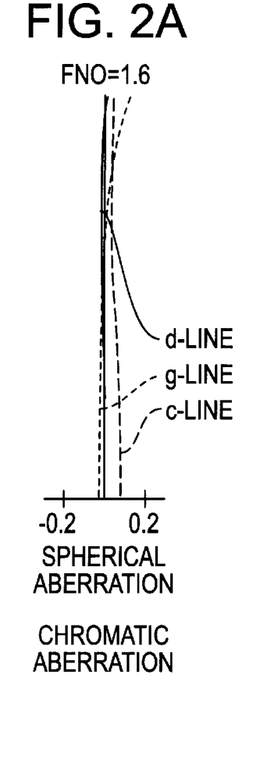
FIGS. 2A, 2B, 2C and 2D are aberration diagrams of a zoom lens system shown in FIG. 1.
Figure 2B:
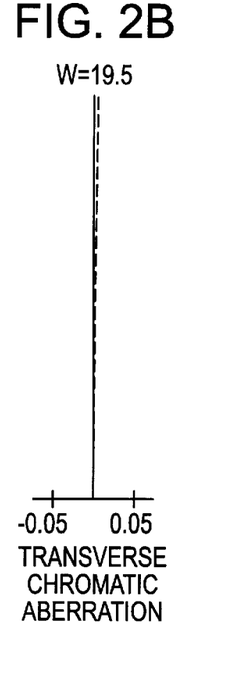
Figure 2C:
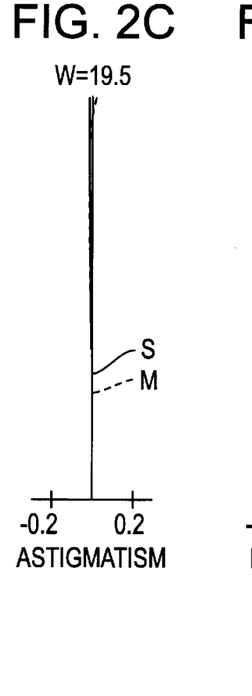
Figure 2D:
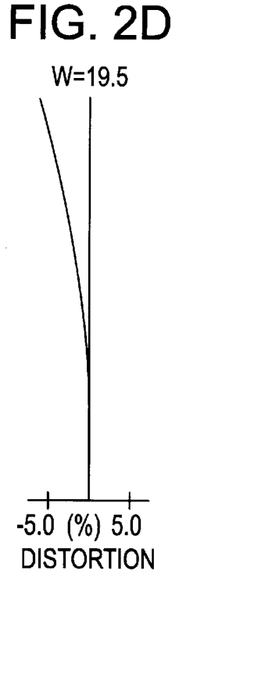
Figure 3:
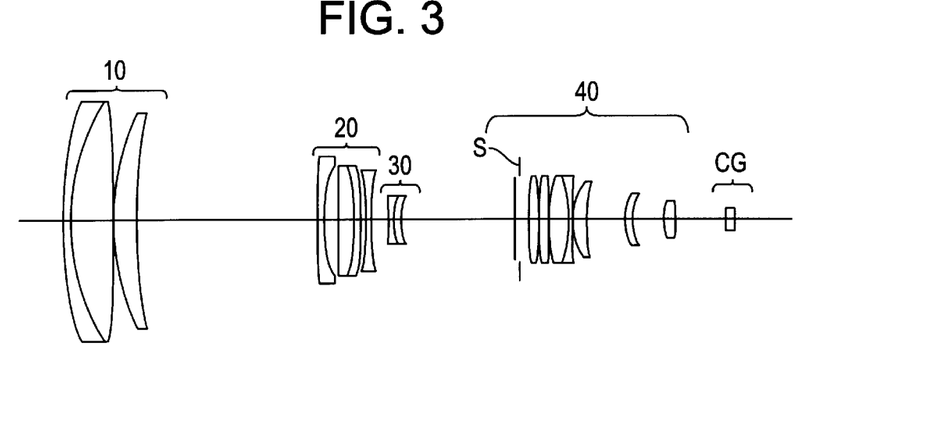
FIG. 3 is a schematic view showing the lens arrangement of a first embodiment of a zoom lens system of high zoom ratio at an intermediate focal length, according to the present invention.
Figure 4A:
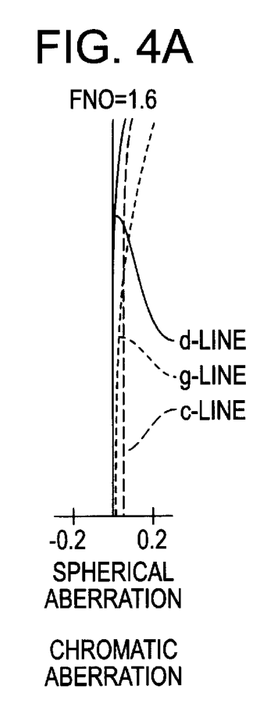
FIGS. 4A, 4B, 4C and 4D are aberration diagrams of a zoom lens system shown in FIG. 3.
Figure 4B:
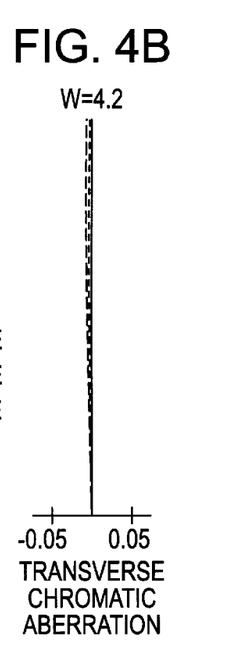
Figure 4C:
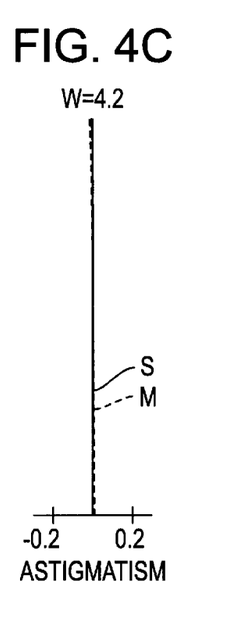
Figure 4D:
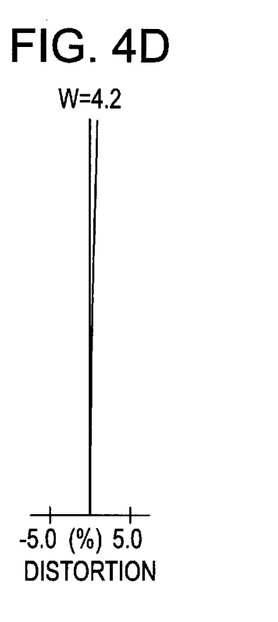
Figure 5:
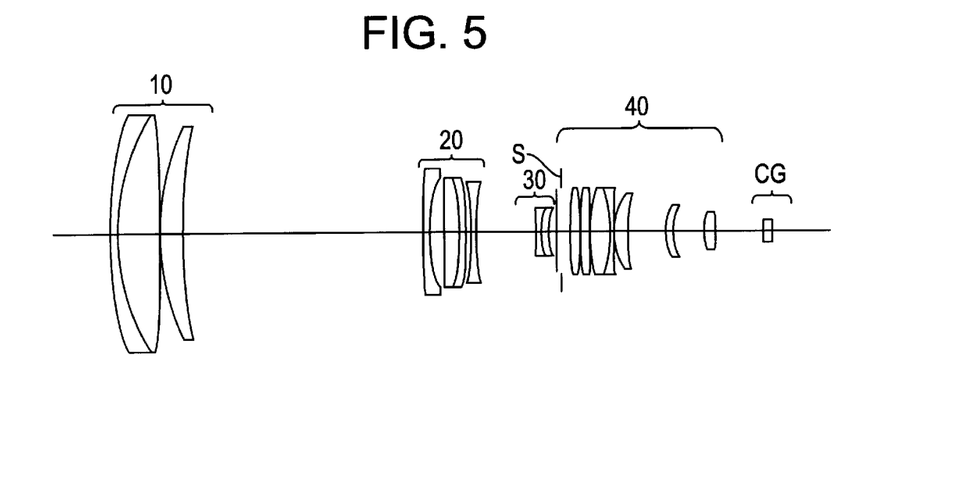
FIG. 5 is a schematic view showing the lens arrangement of a first embodiment of a zoom lens system of high zoom ratio at the long focal length extremity, according to the present invention.
Figure 6A:
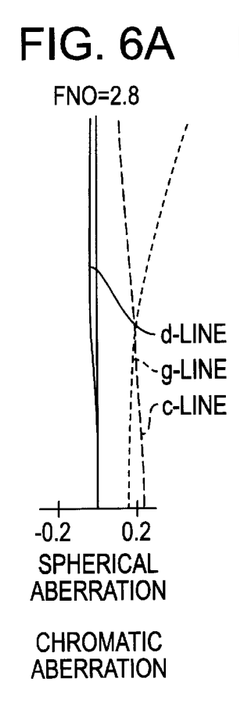
FIGS. 6A, 6B, 6C and 6D are aberration diagrams of a zoom lens system shown in FIG. 5.
Figure 6B:
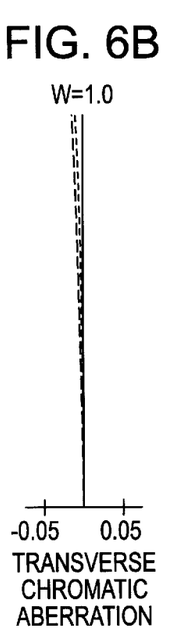
Figure 6C:
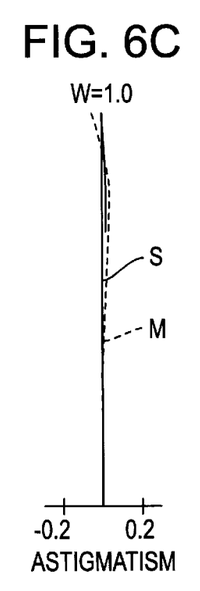
Figure 6D:
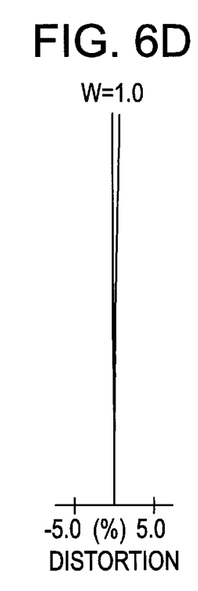

FIGS. 1 through 6 show a first embodiment of the zoom lens system of high zoom ratio. FIGS. 1, 3 and 5 show a lens arrangement of the zoom lens system at the short focal length extremity, an intermediate focal length and the long focal length extremity, respectively. In the first embodiment, the lens system is composed of a first positive lens group 10, a second negative lens group 20, a third negative lens group 30, a fourth positive lens group 40, and a glass cover CG. These lens groups 10 through 40 and the glass cover CG are arranged in this order from the object side. The first and fourth lens groups 10 and 40 are stationary. Upon zooming, the second and third lens groups 20 and 30 are moved. A diaphragm S is located in the fourth lens group 40. FIGS. 2A through 2D, FIGS. 4A through 4D and FIGS. 6A through 6D show aberration diagrams of the zoom lens system shown in FIG. 1, at the short focal length extremity, the intermediate focal length extremity, and the long focal length extremity, respectively.

Numerical data of the lens system is shown in Table 1 below. In the aberration diagrams, d-line, g-line and C-line represent the chromatic aberrations represented by spherical aberrations and lateral chromatic aberrations at the respective wavelengths, SA represents the spherical aberrations, SC represents the sine conditions, S represents the Sagittal rays, and M represents the Meridional rays, respectively.

In the following tables and drawings, FNO designates the F-number, F the focal length, W the half angle of view, $f_B$ the back focal distance including the glass cover (reduced back focal distance between the last surface of the fourth lens group and the CCD image pickup surface, i.e., the last surface of the glass cover), R the radius of curvature, D the distance between the lenses, $N_d$ the refractive index of the d-line, and $v_d$ the Abbe number, respectively.

TABLE 1

$F_{NO} = 1:1.6–1.6–2.8$
$F = 12.02–54.00–234.00$ (zoom ratio; 19.47)
$W = 19.5–4.2–1.0$
$f_B = 19.83$ $(=D_{30} + D_{31}/N_{31}$, reduced back focal distance)

| Surface No. | R | D | $N_d$ | $v_d$ |
|---|---|---|---|---|
| 1 | 150.760 | 2.80 | 1.80518 | 25.4 |
| 2 | 87.610 | 14.50 | 1.61800 | 63.4 |
| 3 | −685.601 | 0.20 | — | — |
| 4 | 92.459 | 8.00 | 1.49700 | 81.6 |
| 5 | 247.372 | 2.00–61.62–82.76 | — | — |
| 6 | 345.600 | 2.00 | 1.61800 | 63.4 |
| 7 | 51.954 | 4.80 | — | — |
| 8 | ∞ | 6.00 | 1.84666 | 23.8 |
| 9 | −76.291 | 2.00 | 1.72000 | 43.7 |
| 10 | −152.991 | 2.00 | — | — |
| 11 | −65.500 | 1.80 | 1.72916 | 54.7 |
| 12 | 82.000 | 63.37–6.01–21.54 | — | — |
| 13 | −68.000 | 1.60 | 1.61772 | 49.8 |
| 14 | 17.416 | 2.90 | 1.80518 | 25.4 |
| 15 | 35.459 | 41.42–39.17–2.50 | — | — |
| 16 | ∞ | 0.50 | 1.51633 | 64.1 |
| 17 | ∞ | 1.00 | — | — |
| diaphragm | ∞ | 3.00 | — | — |
| 18 | 123.000 | 3.50 | 1.80400 | 46.6 |
| 19 | −123.000 | 0.10 | — | — |
| 20 | 99.000 | 3.30 | 1.69680 | 55.5 |
| 21 | −1154.546 | 0.10 | — | — |
| 22 | 61.697 | 7.00 | 1.48749 | 70.2 |
| 23 | −51.212 | 1.50 | 1.80518 | 25.4 |
| 24 | 200.755 | 0.10 | — | — |
| 25 | 26.525 | 4.80 | 1.49700 | 81.6 |
| 26 | 61.254 | 13.30 | — | — |
| 27 | 20.675 | 2.40 | 1.74950 | 35.3 |
| 28 | 14.000 | 11.00 | — | — |
| 29 | 27.915 | 3.70 | 1.51633 | 64.1 |
| 30 | −98.790 | 17.52 | — | — |
| 31 | ∞ | 3.50 | 1.51633 | 64.1 |
| 32 | ∞ | — | — | — |

<Embodiment 2>

Figure 7:
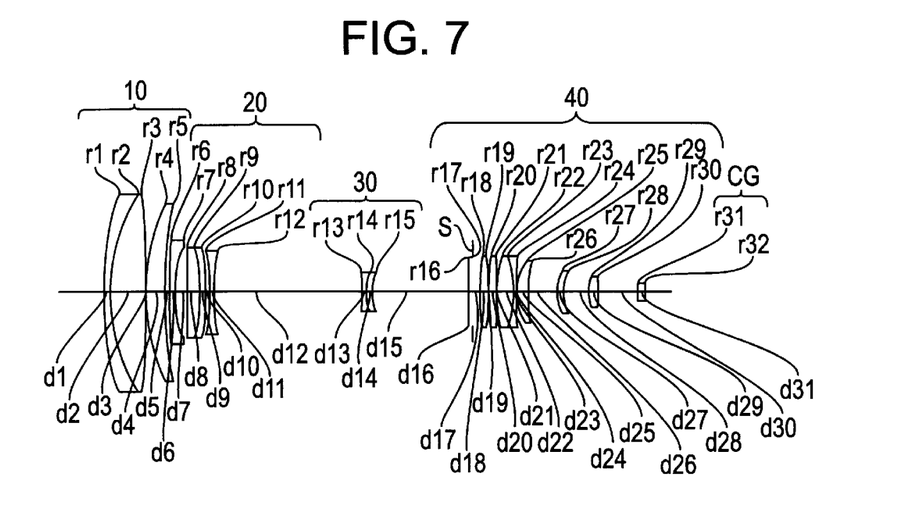
FIG. 7 is a schematic view showing the lens arrangement of a second embodiment of a zoom lens system of high zoom ratio at the short focal length extremity, according to the present invention.
Figure 8A:
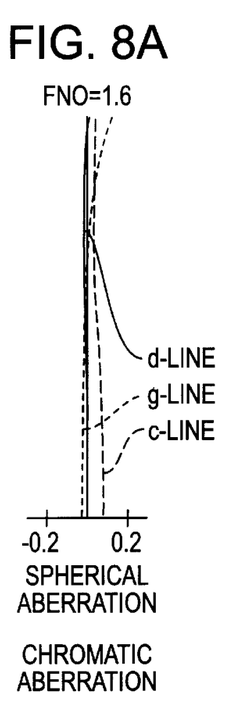
FIGS. 8A, 8B, 8C and 8D are aberration diagrams of a zoom lens system shown in FIG. 7.
Figure 8B:
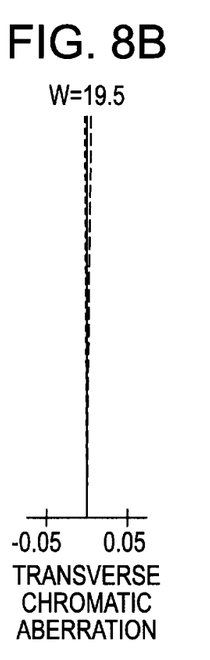
Figure 8C:
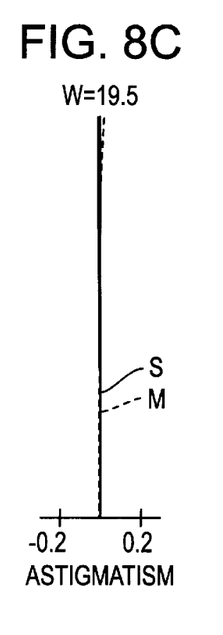
Figure 8D:
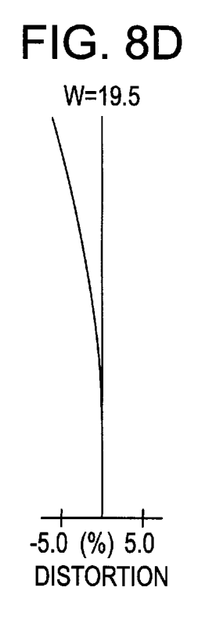
Figure 9:
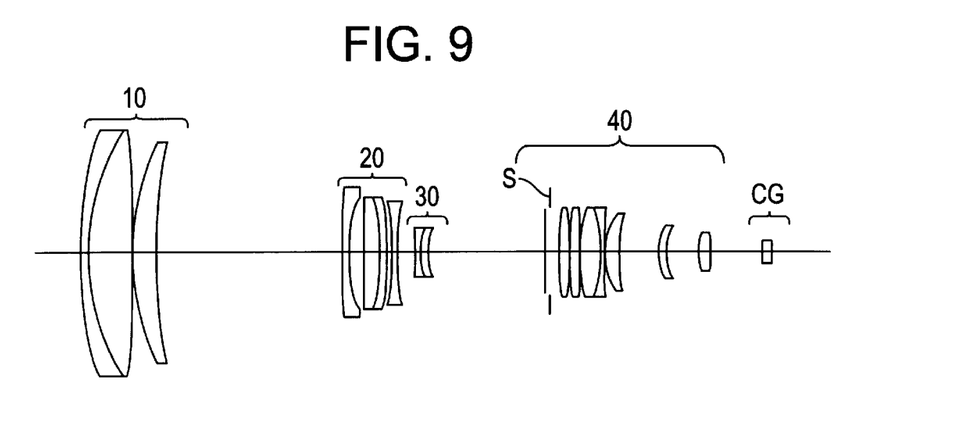
FIG. 9 is a schematic view showing the lens arrangement of a second embodiment of a zoom lens system of high zoom ratio at an intermediate focal length, according to the present invention.
Figure 10A:
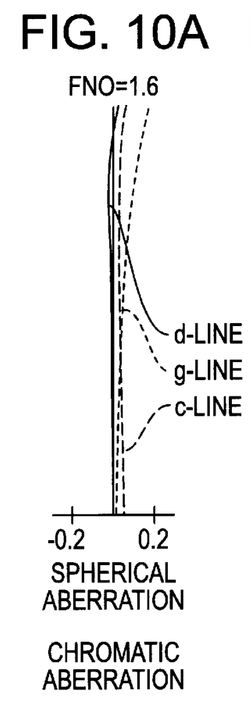
FIGS. 10A, 10B, 10C and 10D are aberration diagrams of a zoom lens system shown in FIG. 9.
Figure 10B:
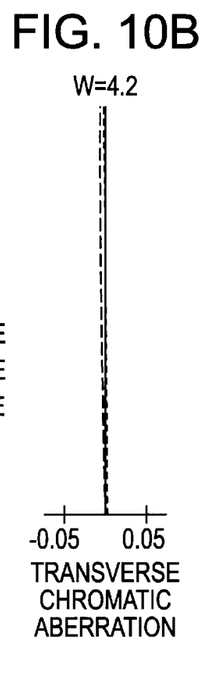
Figure 10C:
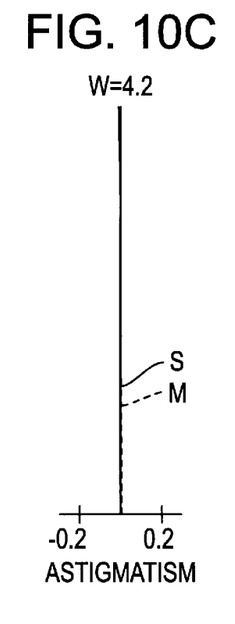
Figure 10D:
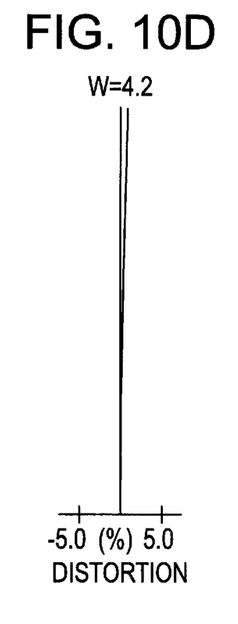
Figure 11:
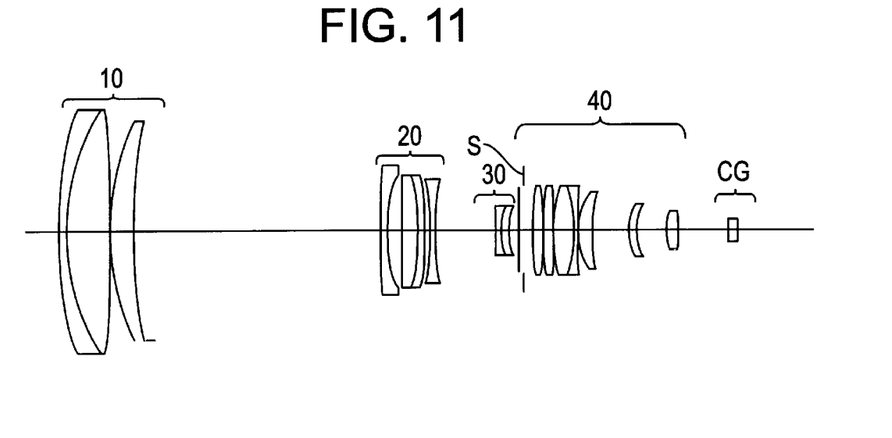
FIG. 11 is a schematic view showing the lens arrangement of a second embodiment of a zoom lens system of high zoom ratio at the long focal length extremity, according to the present invention.
Figure 12A:
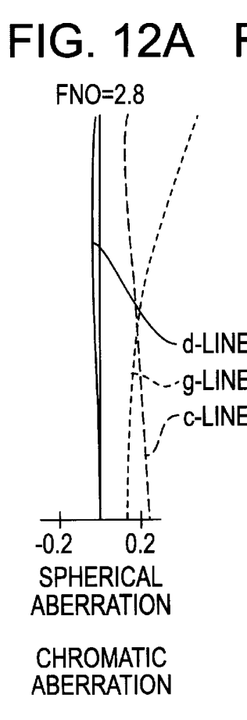
FIGS. 12A, 12B, 12C and 12D are aberration diagrams of a zoom lens system shown in FIG. 11.
Figure 12B:
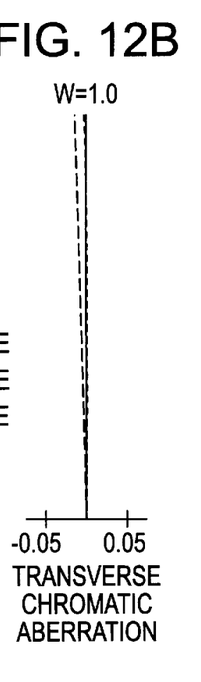
Figure 12C:
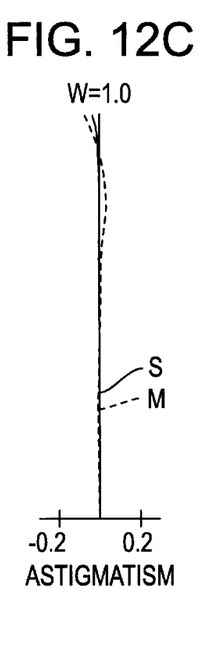
Figure 12D:
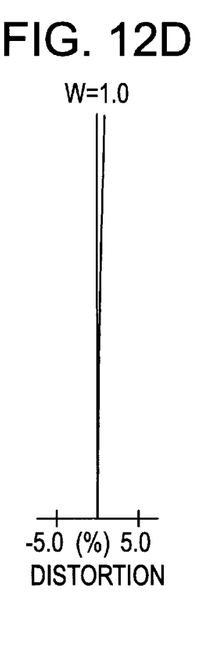

FIGS. 7 through 12 show a second embodiment of a zoom lens of high zoom ratio, according to the present invention. FIGS. 7, 9 and 11 show a lens arrangement thereof at the short focal length extremity, an intermediate focal length, and the long focal length extremity. FIGS. 8A through 8D, FIGS. 10A through 10D and FIGS. 12A through 12D show aberration diagrams of the zoom lens system shown in FIGS. 7, 9 and 11, respectively. Numerical data of the second embodiment of the lens system is shown in Table 2 below.

TABLE 2

$F_{NO} = 1:1.6–1.6–2.8$
$F = 12.00–54.00–234.00$ (zoom ratio; 19.50)
$W = 19.5–4.2–1.0$
$f_B = 19.44$ $(=D_{30} + D_{31}/N_{31}$, reduced back focal distance)

| surface No. | R | D | $N_d$ | $v_d$ |
|---|---|---|---|---|
| 1 | 151.327 | 2.80 | 1.78470 | 26.3 |
| 2 | 86.000 | 14.40 | 1.61800 | 63.4 |
| 3 | −704.000 | 0.20 | — | — |
| 4 | 93.500 | 8.00 | 1.49700 | 81.6 |
| 5 | 249.207 | 2.00–62.15–83.22 | — | — |
| 6 | 275.000 | 1.90 | 1.61800 | 63.4 |
| 7 | 50.165 | 4.80 | — | — |
| 8 | −5402.519 | 6.20 | 1.84666 | 23.8 |
| 9 | −86.000 | 1.90 | 1.76200 | 40.1 |

TABLE 2-continued $F_{NO} = 1:1.6–1.6–2.8$
$F = 12.00–54.00–234.00$ (zoom ratio; 19.50)
$W = 19.5–4.2–1.0$
$f_B = 19.44$ $(=D_{30} + D_{31}/N_{31}$, reduced back focal distance)

| surface No. | R | D | $N_d$ | $v_d$ |
|---|---|---|---|---|
| 10 | −160.000 | 1.90 | — | — |
| 11 | −64.907 | 1.60 | 1.72916 | 54.7 |
| 12 | 96.200 | 62.32–4.84–21.55 | — | — |
| 13 | −69.120 | 1.60 | 1.61772 | 49.8 |
| 14 | 17.380 | 2.90 | 1.80518 | 25.4 |
| 15 | 35.200 | 42.89–40.23–2.44 | — | — |
| 16 | ∞ | 0.50 | 1.51633 | 64.1 |
| 17 | ∞ | 1.00 | — | — |
| diaphragm | ∞ | 3.00 | — | — |
| 18 | 121.500 | 3.50 | 1.80400 | 46.6 |
| 19 | −121.500 | 0.10 | — | — |
| 20 | 98.849 | 3.50 | 1.69680 | 55.5 |
| 21 | −2100.000 | 0.10 | — | — |
| 22 | 54.344 | 7.00 | 1.48749 | 70.2 |
| 23 | −54.344 | 1.40 | 1.80518 | 25.4 |
| 24 | 167.164 | 0.10 | — | — |
| 25 | 26.041 | 4.70 | 1.49700 | 81.6 |
| 26 | 57.091 | 13.20 | — | — |
| 27 | 21.500 | 2.40 | 1.74950 | 35.3 |
| 28 | 13.900 | 10.40 | — | — |
| 29 | 27.682 | 3.70 | 1.51633 | 64.1 |
| 30 | −84.000 | 17.13 | — | — |
| 31 | ∞ | 3.50 | 1.51633 | 64.1 |
| 32 | ∞ | — | — | — |

<Embodiment 3>

Figure 13:
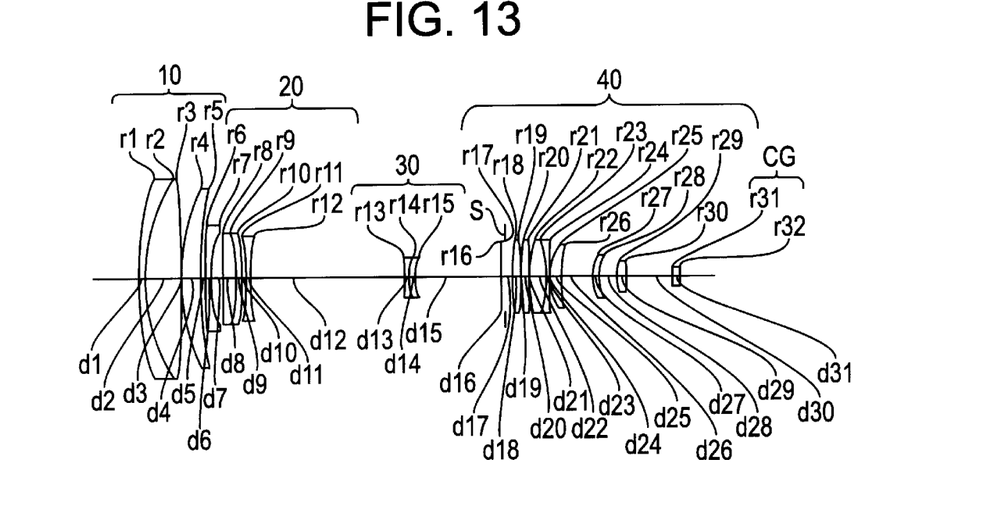
FIG. 13 is a schematic view showing the lens arrangement of a third embodiment of a zoom lens system of high zoom ratio at the short focal length extremity, according to the present invention.
Figure 14A:
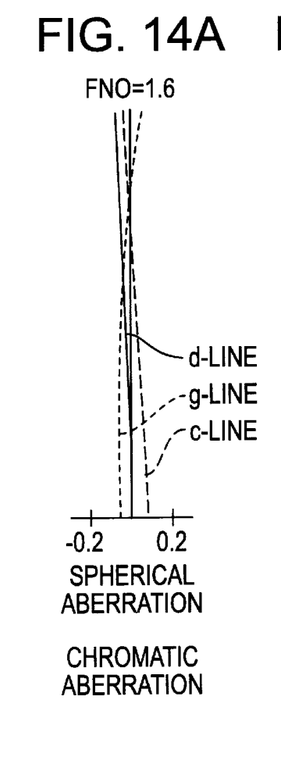
FIGS. 14A, 14B, 14C and 14D are aberration diagrams of a zoom lens system shown in FIG. 13.
Figure 14B:
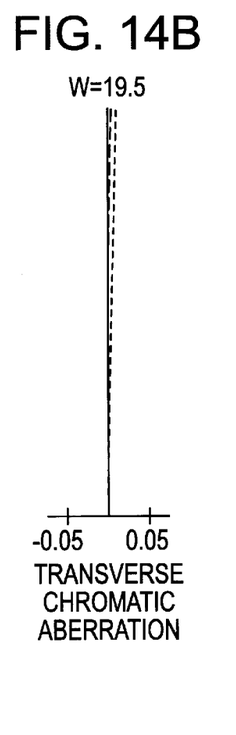
Figure 14C:
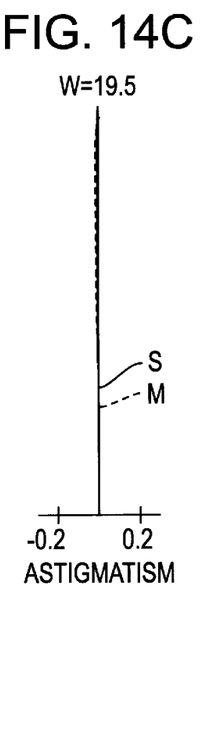
Figure 14D:
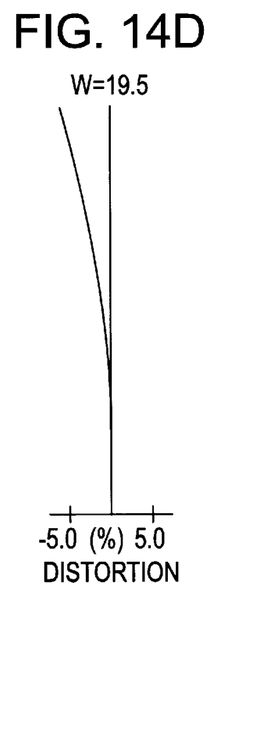
Figure 15:
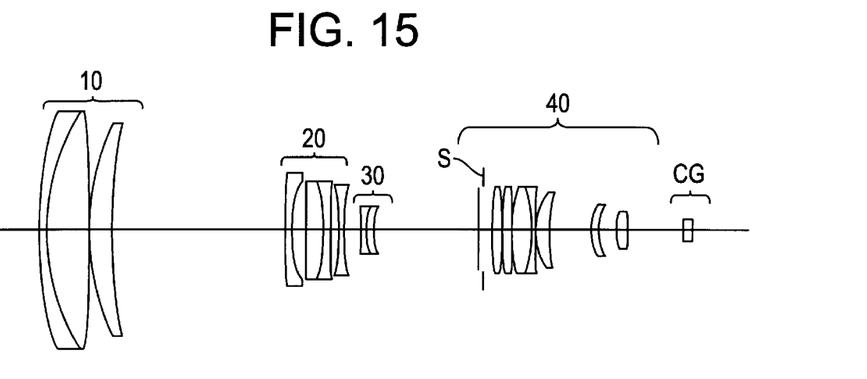
FIG. 15 is a schematic view showing the lens arrangement of a third embodiment of a zoom lens system of high zoom ratio at an intermediate focal length, according to the present invention.
Figure 16A:
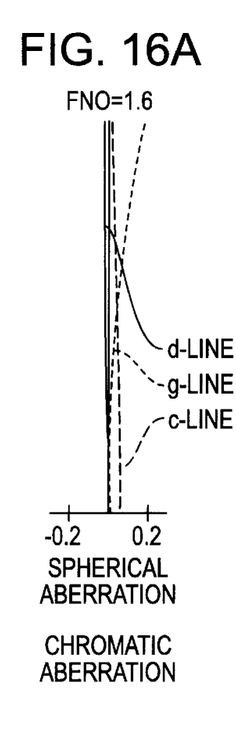
FIGS. 16A, 16B, 16C and 16D are aberration diagrams of a zoom lens system shown in FIG. 15.
Figure 16B:
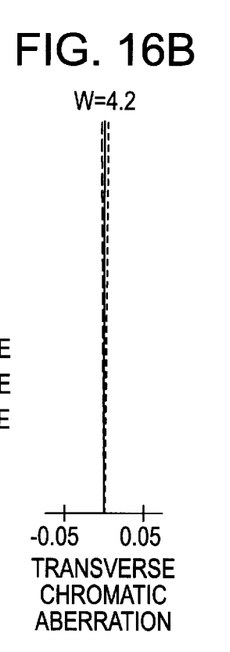
Figure 16C:
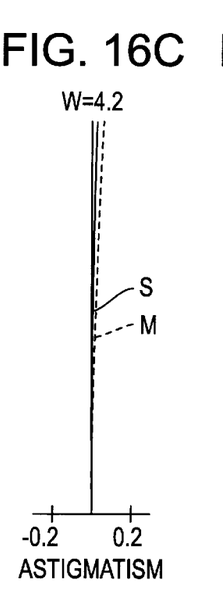
Figure 16D:
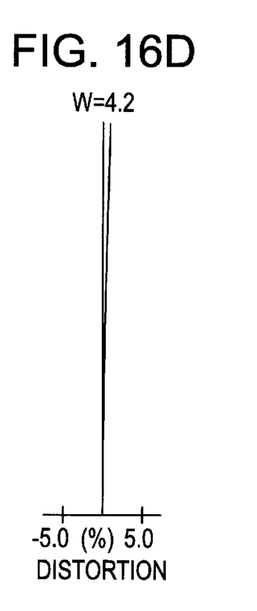
Figure 17:
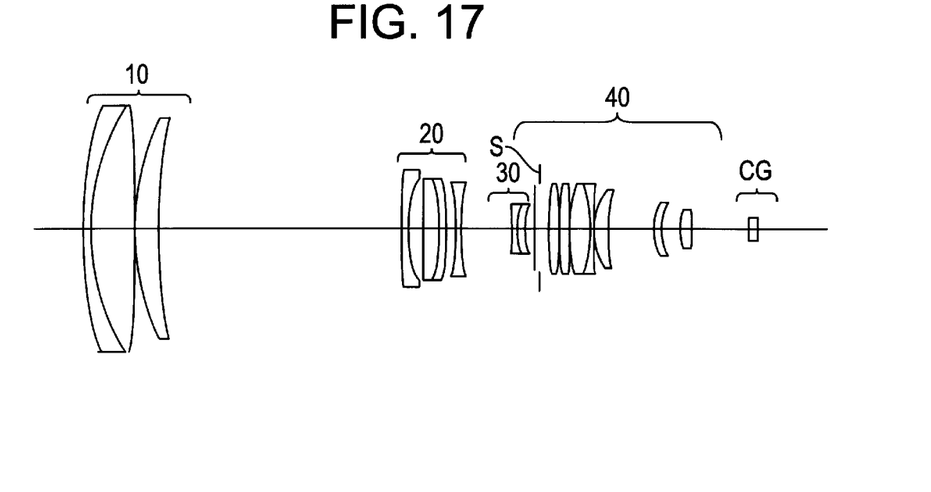
FIG. 17 is a schematic view showing the lens arrangement of a third embodiment of a zoom lens system of high zoom ratio at the long focal length extremity, according to the present invention.
Figure 18A:
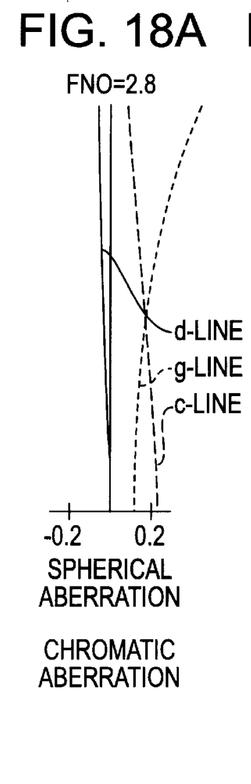
FIGS. 18A, 18B, 18C and 18D are aberration diagrams of a zoom lens system shown in FIG. 17; and, FIG. 19 shows tracks of movement of lens groups of a zoom lens system of high zoom ratio during the zooming operation, according to the present invention.
Figure 18B:
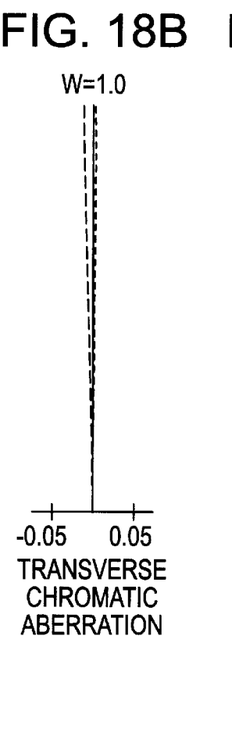
Figure 18C:
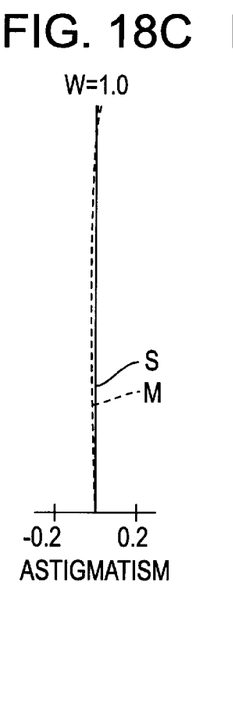
Figure 18D:
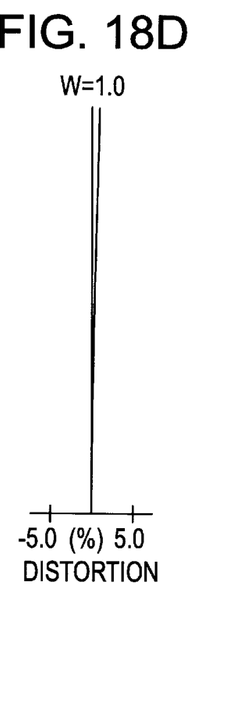

FIGS. 13 through 18 show a third embodiment of a zoom lens of high zoom ratio according to the present invention. FIGS. 13, 15 and 17 show a lens arrangement thereof at the short focal length extremity, an intermediate focal length extremity, and the long focal length extremity, respectively. FIGS. 14A through 14D, FIGS. 16A through 16D and FIGS. 18A through 18D show aberration diagrams of the zoom lens system shown in FIG. 13, 15 and 17, respectively. Numerical data of the third embodiment of the lens system is shown in Table 3 below.

TABLE 3

$F_{NO} = 1:1.6–1.6–2.8$
$F = 12.01–54.00–234.00$ (zoom ratio; 19.48)
$W = 19.5–4.2–1.0$
$f_B = 21.81$ $(=D_{30} + D_{31}/N_{31}$, reduced back focal distance)

| surface No. | R | D | $N_d$ | $v$ |
|---|---|---|---|---|
| 1 | 151.258 | 2.80 | 1.78470 | 26.1 |
| 2 | 84.538 | 14.41 | 1.61800 | 63.4 |
| 3 | −644.580 | 0.19 | — | — |
| 4 | 92.764 | 8.00 | 1.49700 | 81.6 |
| 5 | 264.927 | 2.00–59.34–80.90 | — | — |
| 6 | 159.493 | 1.89 | 1.61800 | 63.4 |
| 7 | 48.238 | 5.90 | — | — |
| 8 | −354.221 | 6.26 | 1.84666 | 23.8 |
| 9 | −48.062 | 1.99 | 1.79453 | 40.5 |
| 10 | −924.540 | 3.38 | — | — |
| 11 | −55.348 | 1.60 | 1.72916 | 54.7 |
| 12 | 186.546 | 63.40–6.16–17.29 | — | — |
| 13 | −71.085 | 1.66 | 1.62000 | 49.5 |
| 14 | 17.261 | 2.88 | 1.80518 | 25.4 |
| 15 | 35.428 | 35.22–35.12–2.44 | — | — |
| 16 | ∞ | 0.50 | 1.51633 | 64.1 |
| 17 | ∞ | 1.00 | — | — |
| diaphragm | ∞ | 3.00 | — | — |
| 18 | 206.388 | 4.81 | 1.80400 | 46.6 |
| 19 | −105.253 | 0.10 | — | — |

TABLE 3-continued $F_{NO} = 1:1.6–1.6–2.8$
$F = 12.01–54.00–234.00$ (zoom ratio; 19.48)
$W = 19.5–4.2–1.0$
$f_B = 21.81$ (=$D_{30} + D_{31}/N_{31}$, reduced back focal distance)

| surface No. | R | D | $N_d$ | ν |
|---|---|---|---|---|
| 20 | 79.867 | 3.73 | 1.70400 | 54.7 |
| 21 | 7149.677 | 0.10 | — | — |
| 22 | 54.143 | 7.05 | 1.48749 | 70.2 |
| 23 | −51.224 | 1.43 | 1.80518 | 25.4 |
| 24 | 194.522 | 0.10 | — | — |
| 25 | 25.511 | 4.50 | 1.49700 | 81.6 |
| 26 | 62.363 | 14.00 | — | — |
| 27 | 19.509 | 2.39 | 1.74950 | 35.3 |
| 28 | 13.157 | 6.98 | — | — |
| 29 | 35.332 | 3.70 | 1.51633 | 64.1 |
| 30 | −78.910 | 19.50 | — | — |
| 31 | ∞ | 3.50 | 1.51633 | 64.1 |
| 32 | ∞ | — | — | — |

Values of the ratios defined in the conditions (1) through (6) for each embodiment are shown in Table 4 below.

TABLE 4

|  | embodiment 1 | embodiment 2 | embodiment 3 |
|---|---|---|---|
| formula (1) | 3.24 | 3.39 | 2.73 |
| formula (2) | 9.09 | 9.13 | 8.57 |
| formula (3) | 0.09 | 0.09 | 0.09 |
| formula (4) | −0.30 | −0.30 | −0.34 |
| formula (5) | 81.6 | 81.6 | 81.6 |
| formula (6) | 81.6 | 81.6 | 81.6 |

As can be seen from Table 4, the numerical values of the first through third embodiments satisfy the conditions (1) through (6).

According to the present invention, a zoom lens system having a high zoom ratio of approximately 20 and high performance can be obtained.

What is claimed is:

1. A zoom lens system comprising a first lens group having positive refracting power, a second lens group having negative refracting power, a third lens group having negative refracting power, and a fourth lens groups having positive refracting power, arranged in this order from the object side, wherein the second and third lens groups are moved during zooming while the first and fourth lens group are stationary during zooming, and wherein the following condition is satisfied:

$$2.73 \leq (D_{3W} - D_{3T})/f_W < 6$$

wherein $D_{3W}$ represents the distance between the third lens group and the fourth lens group at the short focal length extremity, $D_{3T}$ represents the distance between the third lens group and the fourth lens group at the long focal length extremity, and $f_W$ represents the focal length of the entire zoom lens system at the short focal length extremity.

2. A zoom lens system according to claim 1, wherein said lens system satisfies the following condition:

$$6 < (D_{2W} + D_{3W})/f_W < 12$$

wherein $D_{2W}$ represents the distance between the second lens group and the third lens group at the short focal length extremity.

3. A zoom lens system according to claim 1, wherein said lens system satisfies the following conditions:

$$0.05 < f_W/f_1 < 0.12$$
$$-0.5 < f_W/f_2 < -0.1$$

wherein $f_1$ represents the focal length of the first lens group and $f_2$ represents the focal length of the second lens group.

4. A zoom lens system according to claim 1, wherein at least one lens element of the first lens group satisfies the following condition:

$$80 < \nu_{d1}$$

wherein $\nu_{d1}$ represents the Abbe number of said at least one lens element of the first lens group.

5. A zoom lens system according to claim 1, wherein at least one lens element of the fourth lens group satisfies the following condition:

$$80 < \nu_{d4}$$

wherein $\nu_{d4}$ represents the Abbe number of said at least one lens element of the fourth lens group.

* * * * *